No. 701,134. Patented May 27, 1902.
C. J. BEST.
PROCESS OF TREATING ORES.
(Application filed July 26, 1901.)
(No Model.)
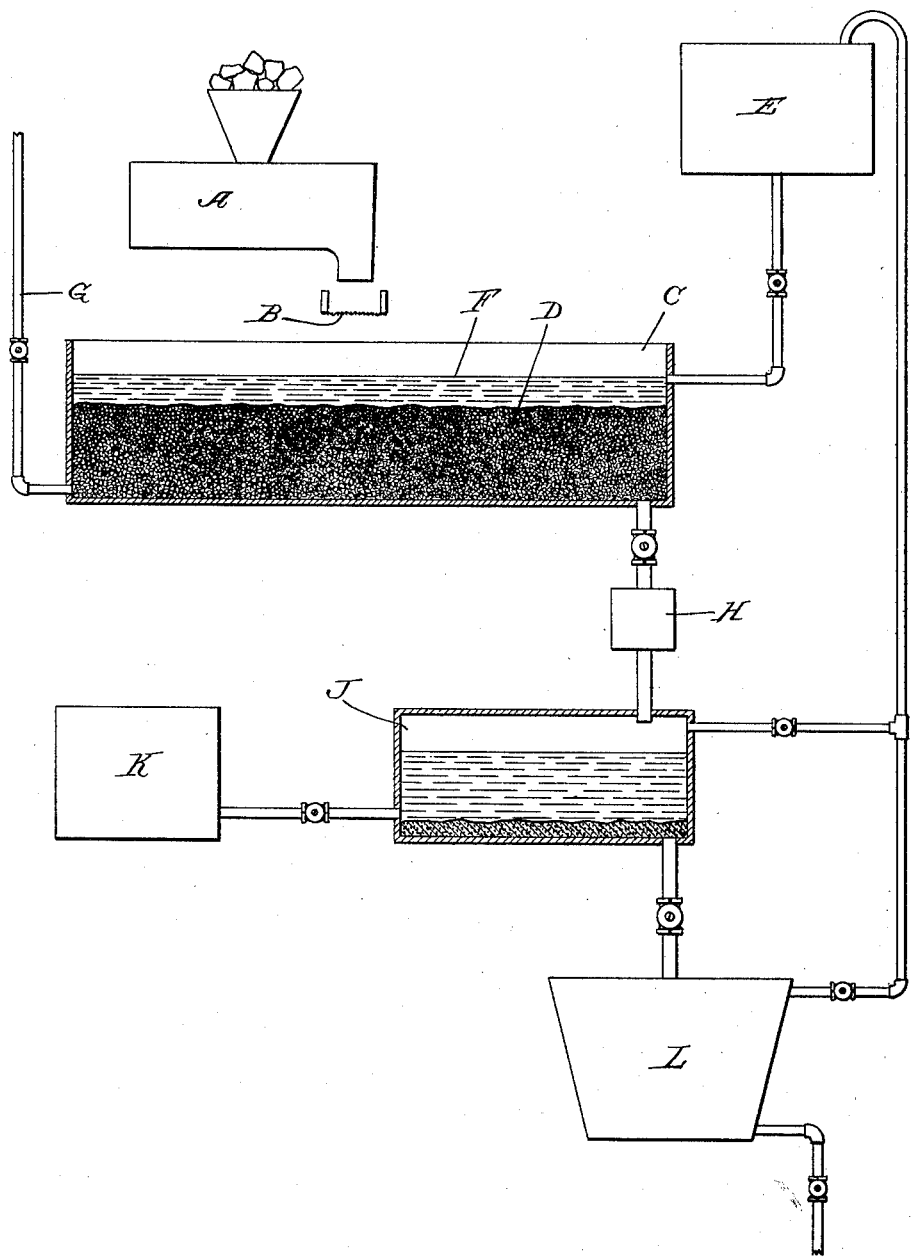
Witnesses.
Edward T. Wray.
Homer L. Kraft.
Inventor.
Charles J. Best
by Parker Carter
his Atty's.

UNITED STATES PATENT OFFICE.

CHARLES J. BEST, OF DENVER, COLORADO.

PROCESS OF TREATING ORES.

SPECIFICATION forming part of Letters Patent No. 701,134, dated May 27, 1902.

Application filed July 26, 1901. Serial No. 69,744. (No specimens.)

*To all whom it may concern:*

Be it known that I, CHARLES J. BEST, a citizen of the United States, residing at Denver, in the county of Arapahoe and State of Colorado, have invented a certain new and useful Improvement in Processes and Compounds for Treating Ores, of which the following is a specification.

My invention relates to processes and compounds for extracting precious metals from their ores.

I have shown diagrammatically an arrangement of devices by means of which my process could be carried out, though it will be understood that these are merely diagrammatic, and I have not undertaken to show the construction of the several parts more than to merely suggest their relation to each other for the purpose of carrying out the process.

A indicates a crusher adapted to receive and crush any kind of ore, and any style, form, size, and shape of crusher will suffice. It is associated with the screen B, which is preferably, approximately, a fifty-mesh screen. The ores having thus passed the fifty-mesh screen are discharged into a tank C, where they are indicated at D.

E is a mixing-vat in which the solution to which the ground ore is to be treated is prepared. This solution consists of certain salts, hereinafter more particularly referred to, a certain quantity of water, and a certain per cent. of acid, the proportions of these three substances differing according to the requirements of any particular case. These products are preferably mixed together separately—as, for example, in the mixer E, whence they are discharged into the tank C until the ore D in the bottom thereof is covered. The height of the solution in the tank is indicated by F.

G is a pipe by which steam may be injected into the tank to heat the contents. The liquid should be kept in a boiling state in the tank for from one to two and a half hours, according to the strength of the ore or the requirements of the particular case. This process results in the dissolving out of the precious metals in the ore by the salt solution, and the solution so charged is now drawn off, preferably through the filter H, into the precipitator J. In this precipitator the metals are to be precipitated, and this is done by discharging sulfureted hydrogen gas from the reservoir or gas-producer K into the precipitator. The result is that a sulfid precipitate is formed which contains the precious metals, and the solution discharged on the precious metals may be again used in the same manner, it being properly strengthened, if necessary, by the addition thereto of more or less of its original elements. The sulfid precipitate is drawn off into the pan L, whereby a suitable application of heat with the ordinary fluxes the gases are driven away and the metals left behind.

The heating of the substances in the tank C may be accomplished in any desired manner, though I have suggested that it be done by discharging steam therein.

It will be observed that mere heat alone is not used; but the sulfid-ores are roasted and then the solution is applied, and by the action of such solution the metals are extracted or reduced to sulfid precipitates. When the sulfid ores are roasted, they become sulfates by the action of the heat. The sodium chlorid in the solution which I employ dissolves the silver chlorid formed by the action of the chlorin on silver, and thus the solution dissolves out the gold, silver, and copper, and they remain in solution until precipitated by the action of sulfid gas. This action is somewhat similar to the action of aqua regia.

The salts used to make the salt mixture are as follows, each being used in approximately the proportions indicated: two parts common salt, one and one-fourth parts niter, one and one-fourth parts alum, and one and one-half parts nitric acid. These figures are approximate, and these proportions may be somewhat varied or equivalents varying in proportion somewhat might be employed for the various parts of this salt mixture. This is what I call my "salt mixture," intending by these words to refer to the compound last above described.

I do not wish to be limited to the precise number of salts used or to their particular description; but salts having qualities similar to the qualities of the salts indicated and used in proportions capable of bringing about the results accomplished by the salts used in the proportions above indicated I consider within the scope of my invention.

I prefer to prepare my compound of salts or salt mixture as a dry mass and then add it to the solution of water and acid in the mixer E.

I have suggested diagrammatically that the solution after the precipitate is formed may be pumped back into the mixer from the tank J for reuse and also that the vapors driven off from the pan L by the heat may be carried back in like manner to the mixer E, thus to avoid the loss of the active principle of the salts. The metal alone may be drawn off from the bottom of the pan.

My preparation is suitable for operating in connection with ores containing copper, iron, silver, and gold, but not with ores containing lead. The heating proposed for the solution causes it to work much more rapidly and to bring out a larger per cent. of the metal. The solution can even be applied to take out almost any other metal other than lead. It is of course evident that the strength of the solution will have to be varied as suggested, according to the kind of metal or metals to be recovered and the percentage of such metals in the ore under treatment.

After the sulfid precipitates are formed their further treatment is simple and any of the ordinary processes can be applied thereto. I have not, therefore, included a description of these processes in my present application.

I claim—

1. The process of treating ores, which consists in grinding them to a suitable fineness, supplying thereto a solution, consisting of a large proportion of water, a small proportion of acid and a salt mixture, consisting approximately of two parts common salt, one and one-quarter parts niter, one and one-quarter parts alum and one and one-half parts nitric acid, boiling the whole for a proper length of time, filtering the solution, precipitating the metallic portions by the application of sulfureted hydrogen to the filtered solution, until a sulfid precipitate is formed, then heating such precipitate with the usual fluxes to drive off the vapors, then drawing off the metals, and then returning such solution and vapors for use in the heating-tank.

2. The process of treating ores, which consists in grinding them to a suitable fineness, supplying thereto a solution, consisting of a large proportion of water, a small proportion of acid and a salt mixture, consisting approximately of two parts common salt, one and one-quarter parts niter, one and one-quarter parts alum and one and one-half parts nitric acid, boiling the whole for a proper length of time, filtering the solution, precipitating the metallic portions by the application of sulfureted hydrogen to the filtered solution, until a sulfid precipitate is formed, then heating such precipitate with the usual fluxes to drive off the vapors, and then drawing off the metals.

3. The process of treating ores, which consists in grinding them to a suitable fineness, supplying thereto a solution, consisting of water, acid and a salt mixture, consisting approximately of two parts common salt, one and one-quarter parts niter, one and one-quarter parts alum and one and one-half parts nitric acid, boiling the whole for a proper length of time, filtering the solution, precipitating the metallic portions by the application of sulfureted hydrogen to the filtered solution, until a sulfid precipitate is formed, then heating such precipitate with the usual fluxes to drive off the vapors, and then drawing off the metals.

4. The process of treating ores, consisting of applying to the properly-ground ores a solution of from one to two parts acid, seventy to eighty parts water and nineteen to twenty-five parts salt mixture, consisting approximately of two parts common salt, one and one-quarter parts niter, one and one-quarter parts alum and one and one-half parts nitric acid, then boiling the compound for from one to two and a half hours, then drawing off the solution and causing a precipitation of the metallic portions to form a sulfid, then by the application of heat with the usual fluxes freeing the metals from the substances with which they are associated by reason of the preceding steps in the process.

5. The process of treating ores, consisting of applying to the properly-ground ores a solution of acid, water and a salt mixture, consisting approximately of two parts common salt, one and one-quarter parts niter, one and one-quarter parts alum and one and one-half parts nitric acid, then boiling the compound for from one to two and a half hours, then drawing off the solution and causing a precipitation of the metallic portions to form a sulfid, then by the application of heat with the usual fluxes freeing the metals from the substances with which they are associated by reason of the preceding steps in the process.

6. The process of treating ores, which consists in grinding them to a suitable fineness, supplying thereto a solution consisting of water, acid and a salt mixture, consisting approximately of two parts common salt, one and one-quarter parts niter, one and one-quarter parts alum and one and one-half parts nitric acid, boiling the whole for a proper length of time, precipitating the dissolved metals as sulfids, then heating such precipitate with the usual fluxes to drive off the vapors, and then drawing off the metals.

CHARLES J. BEST.

Witnesses:
E. C. BETTS,
CAIN NERO.